United States Patent
Miura et al.

(10) Patent No.: US 10,053,548 B2
(45) Date of Patent: Aug. 21, 2018

(54) METHOD AND DEVICE FOR MODIFYING RESIN

(71) Applicant: MEIDENSHA CORPORATION, Tokyo (JP)

(72) Inventors: Toshinori Miura, Yaizu (JP); Mitsuru Kekura, Numazu (JP); Yoshiki Morikawa, Tagata (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 15/575,225

(22) PCT Filed: May 17, 2016

(86) PCT No.: PCT/JP2016/064555
§ 371 (c)(1),
(2) Date: Nov. 17, 2017

(87) PCT Pub. No.: WO2016/186096
PCT Pub. Date: Nov. 24, 2016

(65) Prior Publication Data
US 2018/0148558 A1 May 31, 2018

(30) Foreign Application Priority Data
May 21, 2015 (JP) .................................. 2015-103305

(51) Int. Cl.
*C08F 8/06* (2006.01)
*C08J 7/12* (2006.01)
*C08C 19/04* (2006.01)

(52) U.S. Cl.
CPC .................. *C08J 7/12* (2013.01); *C08C 19/04* (2013.01); *C08F 8/06* (2013.01); *C08J 2323/00* (2013.01)

(58) Field of Classification Search
CPC .................................. C08C 19/04; C08F 8/06
See application file for complete search history.

(56) References Cited

U.S. PATENT DOCUMENTS 3,928,664 A * 12/1975 Tarney ....................... C08J 7/04
427/322
5,069,926 A   12/1991 Iwata et al.
(Continued)

FOREIGN PATENT DOCUMENTS

JP   03-195745 A   8/1991
JP   04-283912 A   10/1992
(Continued)

OTHER PUBLICATIONS

Translation of JP 2013-207005 (2013) (Year: 2013).*
Translation of JP 2008-053562 (2008) (Year: 2008).*
Translation of JP 2005-217232 (2005) (Year: 2005).*

*Primary Examiner* — Robert C Boyle
(74) *Attorney, Agent, or Firm* — Foley & Lardner LLP (57) ABSTRACT

It is a modification apparatus (1) of a resin film (6) for making the surface of the resin film (6) hydrophilic. The modification apparatus (1) has a chamber (2), an unsaturated hydrocarbon supply device (3), and an ozone generating device (4). In the chamber (2), there are provided a supply roll (7) onto which the resin film (6) is previously wound, a take-up roll (8), and a shower head (10). While the resin film (6) wound onto the supply roll (7) is wound onto the take-up roll (8), a high-concentration ozone gas and an unsaturated hydrocarbon gas are supplied to the surface of the resin film (6) moving between the supply roll (7) and the take-up roll (8).

3 Claims, 5 Drawing Sheets (56) References Cited

U.S. PATENT DOCUMENTS

| | | | |
|---|---|---|---|
| 7,767,767 B2* | 8/2010 | Scheie | C08F 8/06 |
| | | | 252/186.1 |
| 8,187,389 B2 | 5/2012 | Miura | |
| 2006/0088658 A1 | 4/2006 | Wu et al. | |
| 2010/0300482 A1* | 12/2010 | Miura | G03F 7/42 |
| | | | 134/1.1 |
| 2015/0125665 A1 | 5/2015 | Nakase et al. | |

FOREIGN PATENT DOCUMENTS

| | | | |
|---|---|---|---|
| JP | 08-335576 A | | 12/1996 |
| JP | 2005-217232 | * | 8/2005 |
| JP | 2005-217232 A | | 8/2005 |
| JP | 2006-124631 A | | 5/2006 |
| JP | 2007-109984 A | | 4/2007 |
| JP | 2008-053562 | * | 3/2008 |
| JP | 2008-053562 A | | 3/2008 |
| JP | 2008-294168 A | | 12/2008 |
| JP | 2009-141028 A | | 6/2009 |
| JP | 2010-153773 A | | 7/2010 |
| JP | 2012-197477 A | | 10/2012 |
| JP | 2012-246543 A | | 12/2012 |
| JP | 2013-207005 | * | 10/2013 |
| JP | 2013-207005 A | | 10/2013 |
| WO | WO 2013/191052 A1 | | 12/2013 |
| WO | WO 2014/203892 A1 | | 12/2014 |

* cited by examiner

TREATMENT WITH ONLY HIGH-CONC. OZONE

METHOD AND DEVICE FOR MODIFYING RESIN

TECHNICAL FIELD

The present invention relates to a resin modification method for modifying the surface of resin and to a modification device.

BACKGROUND ART

Films formed of plastic resins have superior characteristics and are used in many industries. Typical films are exemplified by polyester films, aramid films, olefin films, polypropylene films, PPS (polyphenylene sulfide) films, and PET (polyethylene terephthalate) films. Besides, there are also known films made of PE (polyethylene), POM (polyoxymethylene or acetal resin), PEEK (polyether ether ketone), ABS resin (acrylonitrile, butadiene and styrene copolymerization synthetic resin), PA (polyamide), PFA (ethylene tetrafluoride-perfluoroalkoxyethylene copolymer), PI (polyimide), PVD (polyvinyl dichloride), etc.

In the fields related to smartphones, tablets, liquid-crystal displays, solar panels, automobiles, etc., there is expanding the application of high-function films as indispensable components. The films are made to have high functions not only by film material, but also by technologies such as high functionality of the film layer structure (bulk control), multilayer lamination, surface control, etc. Furthermore, flexible devices that function even on products subjected to deformation are produced by forming electronic devices, wirings, etc. on these films. Thus, the possibility of their application is expanding, such as wearable computer, digital signage capable of being attached to and installed in various places, etc.

In the film multilayer lamination and the film surface control, there is conducted the film surface modification such as in Patent Publication 1. In general, the surface modification is to modify a hydrophobic (water-repellent) film surface to have hydrophilicity, for the purpose of barrier property improvement, durability improvement, wettability improvement (adhesion improvement), etc. That is, the film surface is modified by destroying the molecular structure of the film material surface with a certain means and adding hydrophilic OH groups, O groups, etc.

As specific film surface modification means, there are (1) a physical modification method such as corona discharge, plasma treatment, sputtering treatment, etc., (2) a modification method by UV light irradiation or electron beam irradiation, etc., (3) a modification method by a reactive gas such as ozone, (4) a wet method by a liquid chemical, ozone water, etc., and the like.

It is considered that the modification method (2) by UV light irradiation or electron beam irradiation, etc. is not suitable as a method for modifying only the film surface in view of the film having a property to easily transmit these UV lights and electron beams.

Furthermore, the modification method (3) by a reactive gas has a risk that a sufficient surface modification effect is not obtained. For example, even in ozone gas as a typical reactive gas, there is a risk that oxygen radicals as the reaction active species contributing to the modification reaction cannot sufficiently be supplied to the film surface. Thus, in order to increase supply of oxygen radicals, it is also conducted to forcibly decompose ozone gas by irradiating ozone gas with UV light (e.g., Patent Publication 2). However, oxygen radicals generated by UV light irradiation are oxygen radicals in excited state and extremely high in reactivity. Therefore, its control is difficult. That is, in case that ozone gas is irradiated with UV light, the modification effect is higher as compared with the surface modification with only ozone gas, but it is difficult to supply oxygen radicals to the film surface. Therefore, there is a risk that a sufficient modification effect cannot be obtained.

Furthermore, in the wet modification method (4), there is a risk that its application field is limited by the reasons such as the necessity to have a step of drying the film after the treatment, the necessity to have a post-treatment of a liquid chemical used in the modification treatment and to have a treatment facility, etc.

By such reasons, the physical modification method (1) as being highest in modification effect is the most widely used.

However, in corona discharge, plasma treatment, etc., which are frequently used as the physical modification method (1), there is a risk that a fine modification control, such as uniformity of the modification effect, becomes difficult. This is because the discharge phenomena in corona discharge or plasma treatment is caused by dielectric breakdown of a gas between the electrodes to result in the modification effect being affected by the electrode shape or the electrode surface condition. Furthermore, there is a considerable risk that a high temperature caused by heat generation accompanied with discharge considerably damages the film that becomes a substrate. Moreover, since the electrode surface deteriorates over time by discharge, there is a risk that a constant modification effect cannot be obtained over a long period of time.

Furthermore, in a method such as the physical modification method (1), there is a risk that the modification effect is lost as time passes. For example, it is known that, in a film having a small contact angle of a water drop by a hydrophilic treatment, the contact angle of a water drop returns to a state close to that prior to the treatment in several days. Therefore, it is believed that a long-term storage of the film is difficult. Thus, in some cases, the hydrophilic treatment is conducted two times immediately after the film production and prior to the film use in order to maintain hydrophilicity of the film.

PRIOR ART PUBLICATIONS

Patent Publications

Patent Publication 1: JP Patent Application Publication 2006-124631 A.

Patent Publication 2: JP Patent Application Publication 2012-246543 A.

Patent Publication 3: JP Patent Application Publication 2012-197477 A.

Patent Publication 4: International Publication WO 2013/191052 A1.

Patent Publication 5: JP Patent Application Publication Heisei 4-283912 A.

Patent Publication 6: International Publication WO 2014/203892 A.

Patent Publication 7: JP Patent Application Publication 2008-294168 A.

Patent Publication 8: JP Patent Application Publication 2009-141028 A.

Patent Publication 9: JP Patent Application Publication Heisei 8-335576 A.

SUMMARY OF THE INVENTION

It is an object of the present invention to provide a resin surface treatment technique with an easy surface modification treatment control.

According to one aspect of a resin modification method of the present invention for achieving the above object, there is provided a resin modification method by providing an ozone gas and an unsaturated hydrocarbon gas to a resin to make a surface of the resin hydrophilic, wherein a resin, which has previously been wound onto a winding shaft, is wound onto another winding shaft, and providing the ozone gas and the unsaturated hydrocarbon gas to the resin moving between these winding shafts.

Furthermore, according to another aspect of the resin modification method of the present invention for achieving the above object, in the above resin modification method, the ozone gas has an ozone concentration of 50 volume % or more.

Furthermore, according to another aspect of the resin modification method of the present invention for achieving the above object, in the above resin modification method, the ozone gas and the unsaturated hydrocarbon gas are provided to the resin for one minute or less.

Furthermore, according to one aspect of a modification apparatus of the present invention for achieving the above object, it comprises a treatment furnace having a supply roll onto which a resin is previously wound and a take-up roll onto which the resin supplied from the supply roll is wound; an ozone supply device that supplies an ozone gas to the resin moving from the supply roll to the take-up roll; and an unsaturated hydrocarbon supply device that supplies an unsaturated hydrocarbon gas to the resin moving from the supply roll to the take-up roll.

Furthermore, according to another aspect of the modification apparatus of the present invention for achieving the above object, in the above modification apparatus, a shower head is provided to be opposed to the resin moving from the supply roll to the take-up roll, and the ozone gas and the unsaturated hydrocarbon gas are supplied from the shower head.

Furthermore, according to another aspect of the modification apparatus of the present invention for achieving the above object, in the above modification apparatus, a pair of shower heads is provided in the treatment furnace, and the resin is moved between the pair of shower heads.

Furthermore, according to another aspect of the modification apparatus of the present invention for achieving the above object, in the above modification apparatus, a conveying roll is provided between the supply roll and the take-up roll, and the ozone gas and the unsaturated hydrocarbon gas are supplied to the resin moving on the conveying roll.

Furthermore, according to another aspect of the modification apparatus of the present invention for achieving the above object, in the above modification apparatus, there is provided a shower head that is curved to conform to a curved surface of the conveying roll, and the ozone gas and the unsaturated hydrocarbon gas are supplied from the shower head.

Furthermore, according to another aspect of the modification apparatus of the present invention for achieving the above object, in the above modification apparatus, the shower head has a discharge hole for discharging the ozone gas and a discharge hole for discharging the unsaturated hydrocarbon gas, which are alternate in a direction of the moving of the resin.

Furthermore, according to another aspect of the modification apparatus of the present invention for achieving the above object, in the above modification apparatus, a part of the shower head is provided with a discharge hole for discharging the ozone gas and a discharge hole for discharging the unsaturated hydrocarbon gas.

Furthermore, according to another aspect of the modification apparatus of the present invention for achieving the above object, in the above modification apparatus, in case that a feeding speed of the resin is defined as v (cm/s) and that in a feeding direction of the resin a width of a region in the shower head, in which region the discharge hole for discharging the ozone gas or the discharge hole for discharging the unsaturated hydrocarbon gas is formed, is defined as L (cm), L/v is 3 seconds or longer and 60 seconds or shorter.

Furthermore, according to another aspect of the modification apparatus of the present invention for achieving the above object, in the above modification apparatus, the treatment furnace is provided with a partition plate that divides the treatment furnace into a modification treatment space in which the ozone gas and the unsaturated hydrocarbon gas are reacted with the resin and a storage space in which the supply roll and the take-up roll are provided.

Furthermore, according to another aspect of the modification apparatus of the present invention for achieving the above object, in the above modification apparatus, an inert gas is allowed to flow in the storage space.

Furthermore, according to another aspect of the modification apparatus of the present invention for achieving the above object, in the above modification apparatus, the ozone supply device has a plurality of ozone storing vessels that store liquid ozone.

MODE FOR IMPLEMENTING THE INVENTION

A resin modification method and a modification apparatus according to an embodiment of the present invention are explained in detail with reference to the drawings.

A resin modification method according to an embodiment of the present invention is to conduct a modification of the resin surface by supplying a high-concentration ozone gas and an unsaturated hydrocarbon gas to the resin. It is known that ozone reacts in general with an unsaturated hydrocarbon and a resulting unstable intermediate such as ozonide decomposes into ketone, carboxylic acid, etc.

Furthermore, a modification apparatus according to an embodiment of the present invention is one to conduct a modification of the resin surface by a high-concentration ozone gas and an unsaturated hydrocarbon gas by using a method (a so-called Roll to Roll method) in which, while winding a resin film roll onto another roll, the modification treatment is conducted in the middle of winding. It is considered that a hydrophilic treatment (modification treatment) of the resin surface is conducted by a reaction product between a high-concentration ozone gas and an unsaturated hydrocarbon gas, and thus the modification treatment is conducted mainly in the vicinity of a mixing region between the high-concentration ozone gas and the unsaturated hydrocarbon gas.

As a resin subjected to the modification treatment, there is used a resin that can be formed into film, sheet, cloth or fiber. Specifically, there is used a resin formed by a material, such as polyester resin, aramid resin, olefin resin, polypropylene resin, PPS (polyphenylene sulfide) resin, or PET (polyethylene terephthalate), which is used singly or in combination. Besides, the modification treatment is conducted on a resin made of a material such as PE (polyethylene), POM (polyoxymethylene or acetal resin), PEEK (polyether ether ketone), ABS resin (acrylonitrile, butadiene and styrene copolymerization synthetic resin), PA (polyamide), PFA (ethylene tetrafluoride-perfluoroalkoxyethylene copolymer), PI (polyimide), PVD (polyvinyl dichloride), PC (polycarbonate), PEN (1) (polyether nitrile), and PEN (2) (polyethylene naphthalate).

The high-concentration ozone gas is an ozone gas having an ozone concentration of 20 volume % or greater, preferably 50 volume % or greater, more preferably 90 volume % or greater. Ozone gas produced by a general method (e.g., silent discharge method) has an ozone concentration of 10 volume % or less. Therefore, a high-concentration ozone is produced by fractional distillation of an ozone-containing gas to turn only ozone into liquid based on the vapor pressure difference and then its vaporization again. As an apparatus for producing such high-concentration ozone gas, for example, there is Pure Ozone Generator (MPOG-MP) made by Meidensha Corporation. In MPOG-MP, it is possible to supply a high-concentration ozone gas having an ozone concentration of from 20 volume % to 100 volume %.

The unsaturated hydrocarbon gas is, for example, a gas containing an unsaturated hydrocarbon like a double-bond containing hydrocarbon (alkene), such as ethylene, or a triple-bond containing hydrocarbon (alkyne), such as acetylene. Furthermore, as the unsaturated hydrocarbon, there is used a low-molecular-weight one (for example, one having a carbon atom number of about 10 or less) such as butylene.

The optimum value of the supply ratio of the high-concentration ozone gas to the unsaturated hydrocarbon gas varies depending on the apparatus configuration. They are used for the resin modification treatment, for example, at a molar ratio of ozone:unsaturated hydrocarbon=1:1 to 4:1, more preferably 2:1 to 4:1.

The modification treatment time is, for example, 1 minute or less, more preferably from 3 seconds to 20 seconds. If the treatment time is longer than 1 minute, the resin (film) itself may become clouded or the resin surface may become rough. The treatment may be conducted for 1 minute or longer in case that the resin does not become clouded or the resin surface does not become rough.

It is preferable that the modification treatment temperature is low. However, in order to improve the effect of the modification treatment, the resin may be heated to the extent that the resin is not deformed or deteriorated. For example, the resin is heated at a temperature that is not higher than its glass transition temperature and subjected to the modification treatment.

The total pressure of the mixed gas of the high-concentration ozone gas and the unsaturated hydrocarbon gas is controlled to the level of from several pascals to several thousand pascals, more preferably to the range of from middle vacuum to low vacuum of 50 Pa to 500 Pa. This is to prevent the reaction from becoming uncontrollable as a result of abrupt decomposition reactions of unstable intermediates, such as ozonide, that are generated by the reaction of the high-concentration ozone and the unsaturated hydrocarbon or during its process.

First Embodiment

Figure 1:
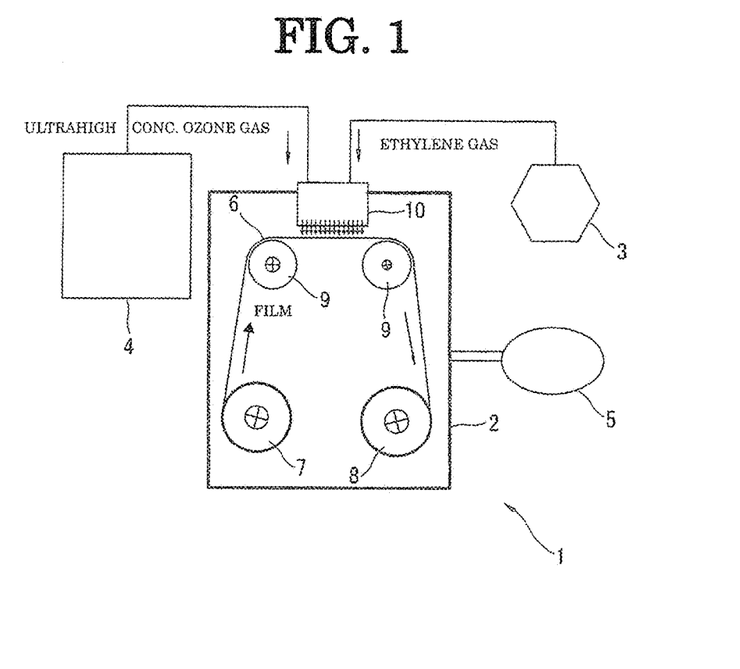
FIG. 1 is a schematic view of a modification apparatus according to the first embodiment of the present invention.

FIG. 1 shows an outline of a resin modification apparatus 1 according to the first embodiment of the present invention. The modification apparatus 1 according to the first embodiment has a chamber 2, an unsaturated hydrocarbon supply device 3, an ozone generating device 4, and a vacuum pump 5.

The chamber 2 is a vacuum container (treatment furnace) for conducting the modification treatment of a resin film 6. In the chamber 2, there are provided a supply roll 7 and a take-up roll 8. The supply roll 7 is a winding shaft onto which the resin film 6 is previously wound, and the take-up roll 8 is a winding roll onto which the resin film 6 supplied from the supply roll 7 is wound. Between the supply roll 7 and the take-up roll 8, there are provided conveying rolls 9, and the resin film 6 supplied from the supply roll 7 moves onto the conveying rolls 9 and are wound onto the take-up roll 8. In the chamber 2, there is provided a shower head 10 to be opposed to the surface of the resin film 6 moving between the supply roll 7 and the take-up roll 8.

Figure 2:
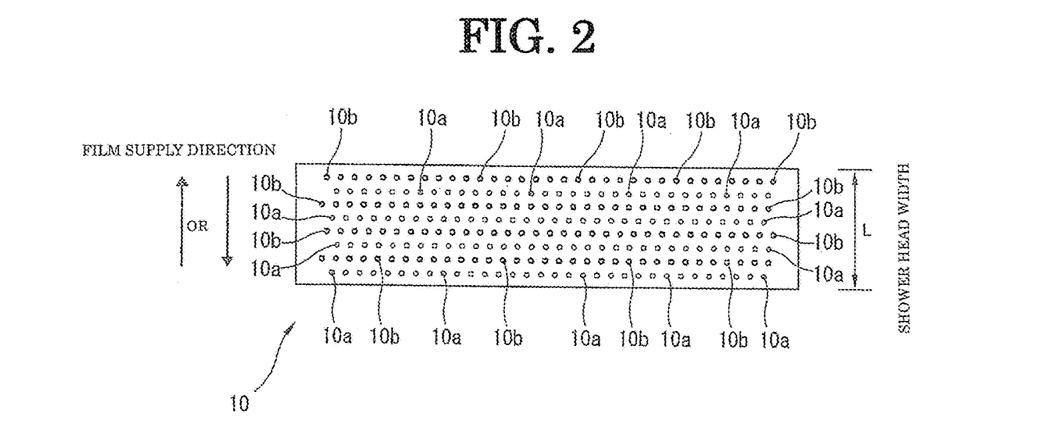
FIG. 2 is a view showing an arrangement example of discharge holes of the shower head.
Figure 3:
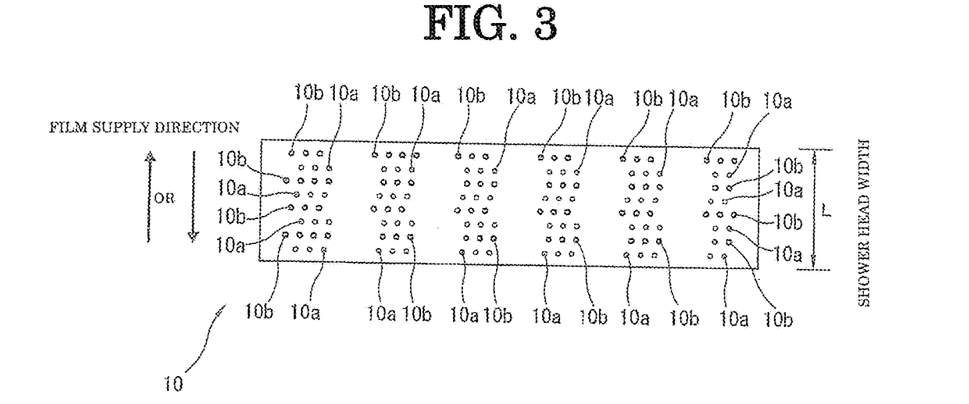
FIG. 3 is a view showing another arrangement example of discharge holes of the shower head.

The shower head 10 supplies the high-concentration ozone gas and the unsaturated hydrocarbon gas to the surface of the resin film 6. To the shower head 10, the unsaturated hydrocarbon supply device 3 and the ozone generating device 4 are connected through pipes. As shown in FIG. 2, the shower head 10 is formed on its surface opposed to the surface of the resin surface 6, with discharge holes 10a for discharging the unsaturated gas and discharge holes 10b for discharging the high-concentration ozone gas, such that the high-concentration ozone gas and the unsaturated hydrocarbon gas are supplied to the surface of the resin film 6. By alternately forming the discharge holes 10a and the discharge holes 10b in the moving direction of the resin film 6, as the resin film 6 is moved, the high-concentration ozone gas and the unsaturated hydrocarbon gas are pulled in the moving direction of the resin film 6, thereby accelerating mixing of these gases. As a result, it is possible to make the mixed gas of the high-concentration ozone gas and the unsaturated hydrocarbon gas efficiently act on the resin film 6. Furthermore, as shown in FIG. 3, if the shower head 10 is partially formed with the discharge holes 10a and the discharge holes 10b, it is possible to make the surface of the resin film 6 partially hydrophilic. The shower head 10 is provided at a position away from the surface of the resin film 6 by several millimeters to several centimeters (e.g., 2 mm to 3 cm). It is possible to more uniformly treat the surface of the resin film 6 by arranging the shower head 10 such that the gas (the high-concentration ozone gas and the unsaturated hydrocarbon gas) discharge surface of the shower head 10 becomes parallel with the treated surface of the resin film 6. Furthermore, it is possible to make the surface of the resin film 6 more uniformly hydrophilic by adjusting error of the distance between the gas discharge surface of the shower head 10 and the surface of the resin film 6 to 1-2 mm.

The unsaturated hydrocarbon supply device 3 supplies the unsaturated hydrocarbon gas to the chamber 2. For example, the unsaturated hydrocarbon supply device 3 has a cylinder filled with the unsaturated hydrocarbon gas and a valve for conducting supply of the unsaturated hydrocarbon gas filled therein and its stop.

The ozone generating device 4 generates the high-concentration ozone gas to be supplied to the chamber 2. That is, the ozone generating device 4 is an ozone supply device for supplying the high-concentration ozone to the chamber 2. The ozone generating device 4 has a low-concentration ozone generating section for generating a low-concentration ozone gas by silent discharge, etc. and a high-concentration ozone generating section for generating a high-concentration ozone gas by a liquid-producing fractional distillation of the low-concentration ozone. If the ozone generating device 4 is equipped with a plurality of ozone storing vessels for storing liquid ozone, when generating the high-concentration ozone from one ozone storing vessel, it becomes possible to make another ozone storing vessel stand by in a condition of being capable of supplying the high-concentration ozone or to make it receive liquid ozone. This makes it possible to continuously supply the high-concentration ozone gas from the ozone generating device 4. As such ozone generating device 4, there is known, for example, Pure Ozone Generator (MPOG-HM1A1) made by Meidensha Corporation.

The vacuum pump 5 is a pump for discharging the gas of the chamber 2 to the outside by conducting a depressurization adjustment of the chamber 2. The modification effect can be obtained by making the vacuum pump 5 conduct exhaustion such that pressure of the chamber 2 becomes several thousand pascals or lower (specifically about 1,000 Pa or lower) during the supply of the gases from the unsaturated hydrocarbon supply device 3 and the ozone generating device 4. The vacuum pump 5 is connected to a side part of the chamber 2 through a pipe. As the vacuum pump 5, an ozone-proof pump (e.g., dry pump) is used. Since the gas discharged from the chamber 2 contains the unreacted ozone, a gas discharging pipe, to which the vacuum pump is connected, is provided with an ozone decomposition device (not shown in the drawings).

Although not shown in the modification apparatus 1 of FIG. 1, it is optional to provide the modification apparatus 1 with a heating mechanism (e.g., infrared heater) for heating the resin film 6 during the modification of the surface of the resin film 6. The heating mechanism is provided, for example, to be opposed to the bottom surface (a resin surface on the opposite side of the resin surface opposed to the shower head 10). It is preferable to provide the heating mechanism 6 at a position away from the resin film 6 by several millimeters, because damage of the resin film 6 is suppressed. The effect of the hydrophilic treatment of the resin film 6 is improved by heating the resin film 6.

EXAMPLE

In this Example, the modification of an organic film (polyolefin film) as an example of the resin film 6 was conducted by a gas reaction with no discharge. Ozone gas and ethylene gas react easily at room temperature, and an active species generated at this time reacts with the polyolefin film surface, thereby making the film surface hydrophilic.

Firstly, a supply roll 7 onto which a polyolefin film had been wound was set in the chamber 2. Then, the inside of the chamber 2 was evacuated to several pascals or less by the vacuum pump 5.

Then, while the polyolefin film supplied from the supply roll 7 was wound onto the take-up roll, high-concentration ozone gas and ethylene gas were supplied from the shower head 10 to the polyolefin film, and gas of the inside of the chamber 2 was exhausted to the outside by the vacuum pump 5. The shower head 10 was disposed at a position where the gas discharge surface was away from the polyolefin film surface by about 1 cm. The pressure ratio of the high-concentration ozone gas to the unsaturated hydrocarbon gas was 1:1, and the treatment pressure (pressure of the chamber 2) was 100 Pa.

Figure 4:
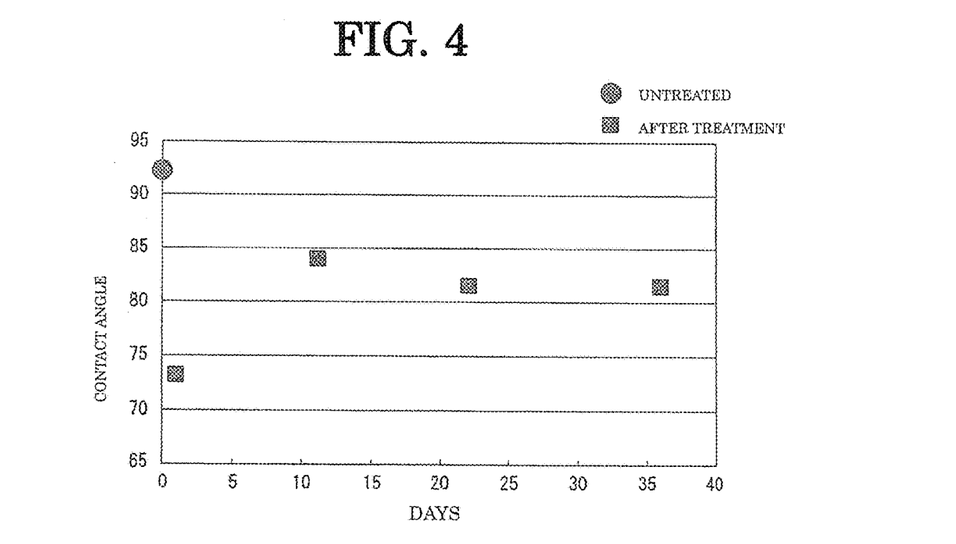
FIG. 4 is a graph showing a change with time of the contact angle on a polyolefin film surface.

Evaluation of wettability of the surface of the polyolefin film after the modification treatment was conducted by the contact angle of a water drop. As shown in FIG. 4, as compared with the untreated polyolefin film, the contact angle became greatly smaller in the polyolefin film after the modification treatment. Therefore, it was confirmed that the surface of the polyolefin film was made hydrophilic by the modification treatment.

Furthermore, the contact angle of a water drop on the surface of the polyolefin film had a tendency to increase after the modification treatment as time elapsed. However, the contact angle of a water drop on the surface of the polyolefin film was smaller than that of the untreated polyolefin film even after more than one month passed from conducting the treatment, and the effect of the modification treatment was maintained for more than one month.

Figure 5:
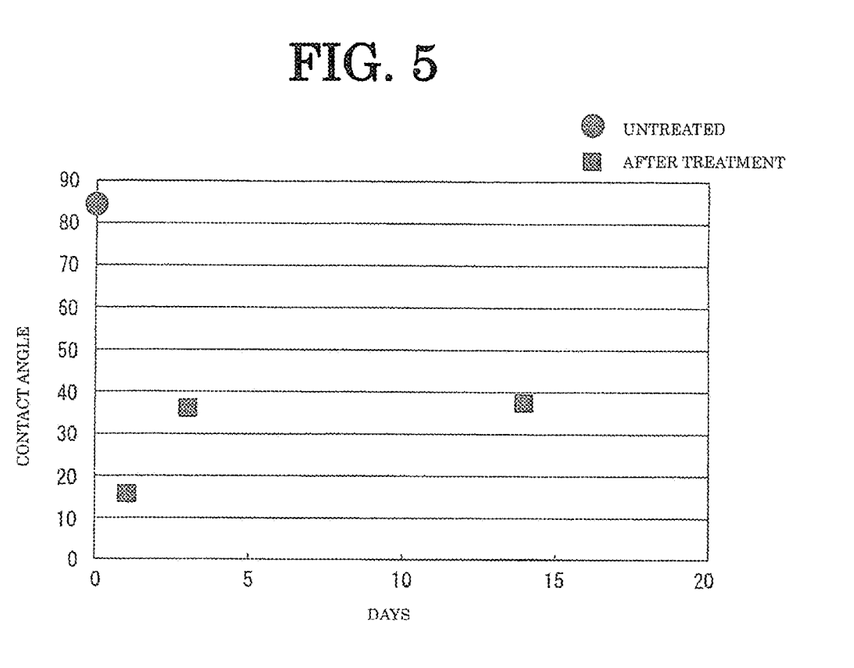
FIG. 5 is a graph showing a change with time of the contact angle on a polyimide film surface.

Even in case that a similar modification treatment was conducted on a polyimide film by using the modification apparatus 1, it was possible to make the film surface hydrophilic like the polyolefin film. As shown in FIG. 5, although there was a tendency that the contact angle of a water drop after the modification treatment in the polyimide film increased as time elapsed, the effect of the modification treatment was maintained for more than 15 days.

By the modification method and the modification apparatus 1 of the resin film 6 according to the first embodiment of the present invention mentioned above, it is possible to greatly improve wettability of the surface of the resin film 6. Specifically, it is possible to greatly decrease the contact angle of a water drop on the surface of the resin film 6. This is considered that a mixed gas (and an intermediate generated by the reaction) between the high-concentration ozone gas and the unsaturated hydrocarbon gas reacts with the resin film 6 to make the surface rough and thereby increase the surface area, and to provide hydrophilic groups, such as hydroxyl group, generated by the reaction between the high-concentration ozone gas and the unsaturated hydrocarbon gas, thereby resulting in more effectively making the resin film 6 hydrophilic.

Furthermore, by the modification method of the resin film 6 according to the first embodiment of the present invention, it is possible to conduct a surface modification treatment that is small in these wettability effect disappearance after the modification treatment. For example, in the hydrophilic treatment of a resin film by corona discharge, plasma treatment, etc., it was necessary sometimes to conduct the modification treatment at the time of making the resin film and at the time immediately before the use in various applications such as bonding, thereby making the operation cumbersome. In contrast with this, in the modification method of the resin film 6 according to the first embodiment of the present invention, it is possible to maintain the effect of the modification treatment. Therefore, it becomes possible to store the resin film 6 according to loads of various treatments. Furthermore, it is possible to separate from each other an apparatus for conducting the hydrophilic treatment and an apparatus for conducting a treatment such as bonding, thereby improving flexibility of the facility arrangement.

Figure 6:
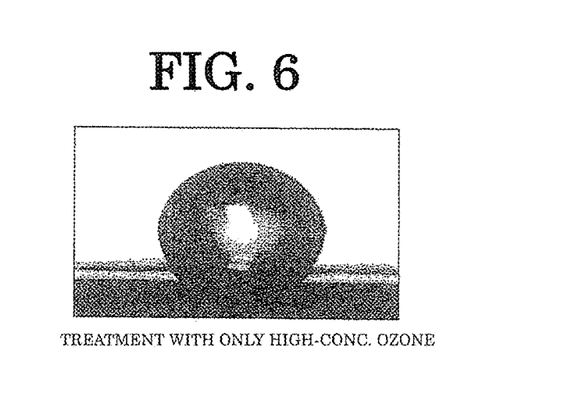
FIG. 6 is a view showing the condition of a water drop in case that a polyimide film was treated with only a high-concentration ozone gas.

That is, by the modification method of the resin film 6 according to the first embodiment of the present invention, the high-concentration ozone gas and the unsaturated hydrocarbon gas are supplied to the surface of the resin film 6. Thereby, it is possible to generate a reaction gas of ozone and the unsaturated hydrocarbon in the vicinity of the surface of the resin film 6 to conduct a modification of the surface of the resin film 6. In particular, by adjusting ozone concentration of the high-concentration ozone gas to 50 volume % or greater (more preferably 90 volume % or greater), it is possible to sufficiently generate a reaction gas of ozone and the unsaturated hydrocarbon on the surface of the resin film 6, thereby assuredly conducting modification of the resin film 6. As shown in FIG. 6, in case that the modification treatment was conducted by supplying only a high-concentration ozone gas to the resin film 6, the contact angle of a water drop remained large, and it was not possible to sufficiently obtain the surface modification effect (for example, the wettability improvement effect).

Furthermore, it is possible to more uniformly and continuously conduct the modification treatment on the surface of the resin film 6 having a long size and a large area by supplying the high-concentration ozone gas and the unsaturated hydrocarbon gas to the resin film 6 moving from the supply roll 7 to the take-up roll 8. Furthermore, if the ozone generating device 4 is equipped with a plurality of ozone storing vessels, it becomes possible to continuously supply the high-concentration ozone gas to continuously treat the resin film 6.

Furthermore, the modification method of the resin film 6 according to the first embodiment of the present invention is for the purpose of the surface modification of the resin film 6. Therefore, the modification treatment of the resin film 6 is conducted in a condition (time or temperature) in which the surface of the resin film 6 does not become rough and in which the resin film 6 is not deformed or deteriorated. As a result, the surface modification reaction of the resin film 6 based on the reaction between the high-concentration ozone and the unsaturated hydrocarbon can be stopped at a reaction until a stage where the molecular structure on the film surface is destroyed and O groups or OH groups are added. For example, if the modification time of the resin film 6 is adjusted to 1 minute or shorter, it is possible to suppress the generation of roughness, etc. of the surface of the resin film 6, thereby conducting modification of the surface of the resin film 6. That is, in accordance with the predetermined modification time t (s) and the width L in the supply direction of the resin film 6 in a region of the shower head 10 where the discharge holes 10a or the discharge holes 10 have been formed, it is possible to control the modification treatment of the resin film 6 by calculating the supply speed v (cm/s) of the resin film 6 (v=L/t) and controlling the supply speed v of the resin film 6. Specifically, this width L is defined as the distance between the discharge holes 10a (or discharge holes 10b) formed at both ends in the shower head 10 in the supply direction of the resin film 6. However, in case that the entire surface of the shower head 10 that is opposed to the resin film 6 is formed with the discharge holes 10a or the discharge holes 10b, the width of the shower head 10 in the supply direction of the resin film 6 can be regarded as the width L.

As a conventional technique, there is a technique of using a mixed gas of a high-concentration ozone gas and an unsaturated hydrocarbon gas for removing a resist. It is considered that this treatment is for the purpose of removing organic matter from the treatment target and is not suitable for the surface modification of the resin film 6. This is because, under the surface treatment condition for the purpose of removing resist, there is a risk that the resin material is removed from the surface of the resin film 6, and thereby the surface of the resin film 6 is made rough.

Furthermore, a discharge treatment, such as corona discharge or plasma treatment, which is frequently used as a physical modification method, is conducted under atmospheric pressure to generate ozone. If the generated ozone leaks to the surroundings, it causes health hazard to the operator. Besides, it affects parts (parts for vibration reduction, sealing and insulation uses) made of rubber, resin, etc. in the apparatus, peripheral devices, etc. to deteriorate these parts. In particular, in case that the parts made of rubber, resin, etc. are used in electric insulation application, there is a risk that it causes insulation failure, electrical leakage, etc. of the apparatus or the devices. In contrast with this, in the modification apparatus 1 according to the first embodiment of the present invention, it is possible to have no leakage of ozone gas to the outside and thereby to prevent the influence of ozone against the peripheral devices by reacting the high-concentration ozone gas and the unsaturated hydrocarbon gas with the resin film 6 under reduced pressure in the vacuum container (i.e., chamber 2).

Second Embodiment

Figure 7:
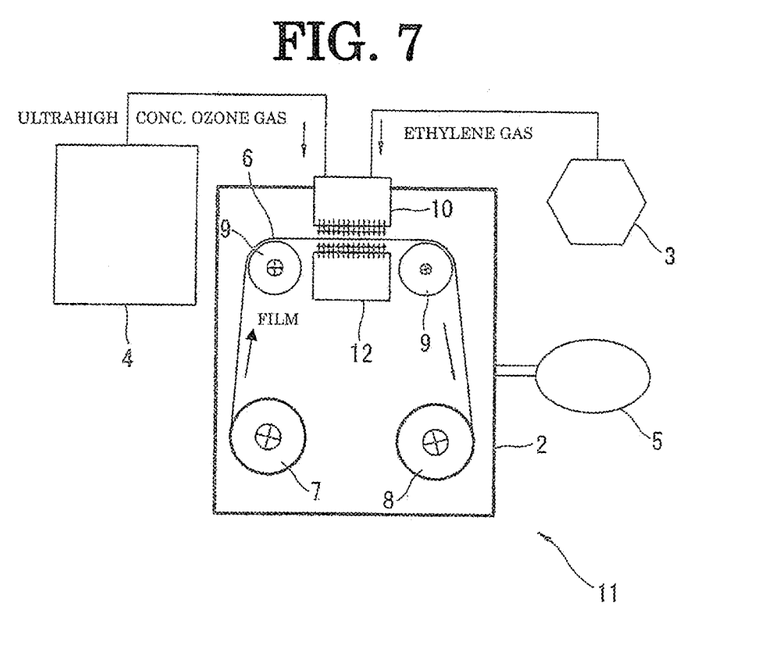
FIG. 7 is a schematic view of a modification apparatus according to the second embodiment of the present invention.

With reference to FIG. 7, a modification apparatus 11 of the resin film 6 according to the second embodiment of the present invention is explained in detail. The modification apparatus 11 according to the second embodiment is different from the modification apparatus 1 according the first embodiment in that a pair of shower heads 10, 12 has been provided in the chamber 2. Therefore, structures similar to those of the modification apparatus 1 according to the first embodiment are designated by the same symbols, and different structures are explained in detail.

As shown in FIG. 7, the modification apparatus 11 according to the second embodiment of the present invention has a chamber 2, an unsaturated hydrocarbon supply device 3, an ozone generating device 4, and a vacuum pump 5.

In the chamber 2, there are provided a supply roll 7 and a take-up roll 8. The shower heads 10, 12 are provided to be opposed to the surfaces of the resin film 6 moving between the supply roll 7 and the take-up roll 8.

The shower head 10 is provided to be opposed to one surface of the resin film 6. The surface of the shower head 10 opposed to the resin film 6 is formed with the unsaturated hydrocarbon discharge holes 10a and the high-concentration ozone gas discharge holes 10b as shown in FIG. 2 (or FIG. 3). To the shower head 10, the unsaturated hydrocarbon supply device 3 and the ozone generating device 4 are connected through pipes.

The shower head 12 is provided to be opposed to the other surface of the resin film 6. Similar to the shower head 10, the surface of the shower head 12 opposed to the resin film 6 is formed with the unsaturated hydrocarbon discharge holes and the high-concentration ozone gas discharge holes as shown in FIG. 2 (or FIG. 3). To the shower head 12, the unsaturated hydrocarbon supply device 3 and the ozone generating device 4 are connected through pipes. Similar to the shower head 10, the shower head 12 is provided at a position away from the surface of the resin film 6.

When conducting the modification treatment of the resin film 6 by the modification apparatus 11 mentioned above, the supply roll 7 onto which the resin film 6 has been wound is set in the chamber 2, and the chamber is evacuated, for example, to several pascals or less. While the resin film 6 supplied from the supply roll 7 is wound onto the take-up roll 8, the high-concentration ozone gas and the unsaturated hydrocarbon gas are supplied from the shower heads 10, 12 to the resin film 6, and the gas in the chamber 2 is discharged to the outside by the vacuum pump 5 such that pressure in the chamber 2 becomes several thousand pascals or less (e.g., 3,000 pascals or less).

By the modification apparatus 11 according to the second embodiment of the present invention, similar to the modification apparatus 1 according to the first embodiment, it is possible to improve the surface of the resin film 6 in hydrophilicity and to conduct a modification treatment of the resin film 6 that is small in wettability effect disappearance after the modification treatment.

Furthermore, in the modification apparatus 11, a pair of shower heads 10, 12 is provided, and there is provided a structure in which the resin film 6 moves between the shower heads 10, 12. With this, it is possible to simultaneously treat the both surfaces of the resin film 6.

Third Embodiment

Figure 8:
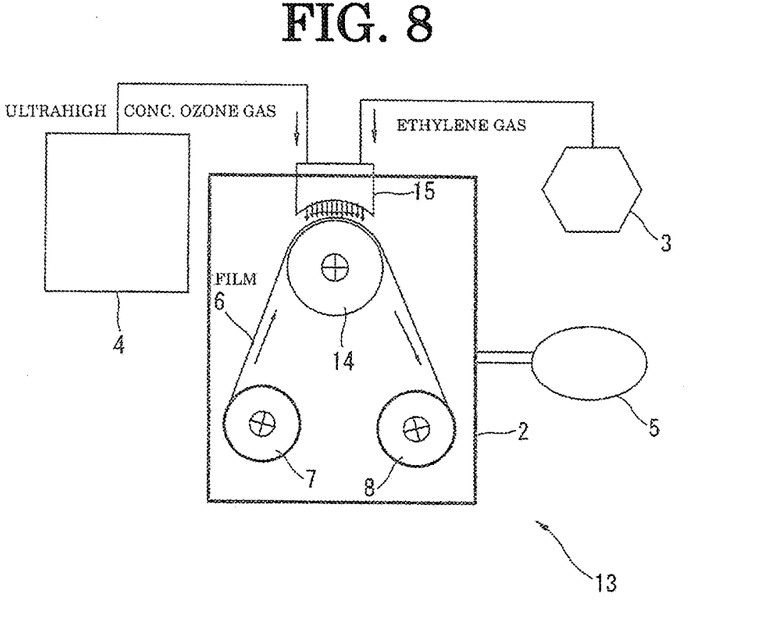
FIG. 8 is a schematic view of a modification apparatus according to the third embodiment of the present invention.

With reference to FIG. 8, a modification apparatus 13 of the resin film 6 according to the third embodiment of the present invention is explained in detail. The modification apparatus 13 according to the third embodiment is different from the modification apparatus 1 according to the first embodiment in that there is provided a conveying roll 14 between the supply roll 7 and the take-up roll 8 and that there is provided a shower head 15 to be opposed to the conveying roll 14. Therefore, structures similar to those of the modification apparatus 1 according to the first embodiment are designated by the same symbols, and different structures are explained in detail.

As shown in FIG. 8, the modification apparatus 13 according to the third embodiment of the present invention has a chamber 2, an unsaturated hydrocarbon supply device 3, an ozone generating device 4, and a vacuum pump 5.

In the chamber 2, there are provided the supply roll 7 and the take-up roll 8. There is provided the conveying roll 14 between the supply roll 7 and the take-up roll 8. The resin film 6 supplied from the supply roll 7 moves on the conveying roll 14 and is wound onto the take-up roll 8. The shower head 15 is provided to be opposed to this conveying roll 14.

The shower head 15 is provided to be opposed to the resin film 6 moving on the conveying roll 14. Similar to the shower head 10, the shower head 15 is provided at a position (for example, several millimeters and several centimeters) away from the resin film 6 moving on the conveying roll 14. As shown in FIG. 2 (or FIG. 3), the surface of the shower head 15 opposing to the resin film 6 is formed with the unsaturated hydrocarbon gas discharge holes and the high-concentration ozone gas discharge holes. To the shower head 15, the unsaturated hydrocarbon supply device 3 and the ozone generating device 4 are connected through pipes. Furthermore, the surface of the shower head 15 that is opposed to the resin film 6 is curved to have a curvature conforming to the roll surface of the conveying roll 14.

Although not shown in FIG. 8, in the case of heating the resin film 6, it is possible to provide the conveying roll 14 with a heating mechanism (for example, thermocouple or infrared heater).

When conducting the modification treatment of the resin film 6 by the modification apparatus 13 mentioned above, the supply roll 7 onto which the resin film 6 has been wound is set in the chamber 2, and the chamber is evacuated, for example, to several pascals or less. While the resin film 6 supplied from the supply roll 7 is wound onto the take-up roll 8, the high-concentration ozone gas and the unsaturated hydrocarbon gas are supplied from the shower head 15 to the resin film 6, and the gas in the chamber 2 is discharged to the outside by the vacuum pump 5 such that pressure in the chamber 2 becomes several thousand pascals or less (e.g., 3,000 pascals or less).

By the modification apparatus 13 according to the third embodiment of the present invention, similar to the modification apparatus 1 according to the first embodiment, it is possible to improve the surface of the resin film 6 in hydrophilicity and to conduct a modification treatment of the resin film 6 that is small in wettability effect disappearance after the modification treatment.

By supplying the high-concentration ozone gas and the unsaturated hydrocarbon gas to the resin film 6 moving on the conveying roll 14, the resin film 6 is suppressed in deflection and flapping. As a result, it is possible to conduct a modification treatment of the resin film 6 in a more uniform manner as compared with the modification apparatus 1 according to the first embodiment.

As compared with a case that the resin film 6 is horizontally moved along the gas discharge surface of the shower head 10 like the modification apparatus 1 according to the first embodiment, it is possible to make the chamber 2 smaller in volume in the modification apparatus 13 according to the third embodiment of the present invention. By making the chamber 2 smaller in volume in this manner, it is possible to use a small one as the vacuum pump 5. As a result, it is possible to make the modification apparatus 13 have a smaller size.

Fourth Embodiment

Figure 9:
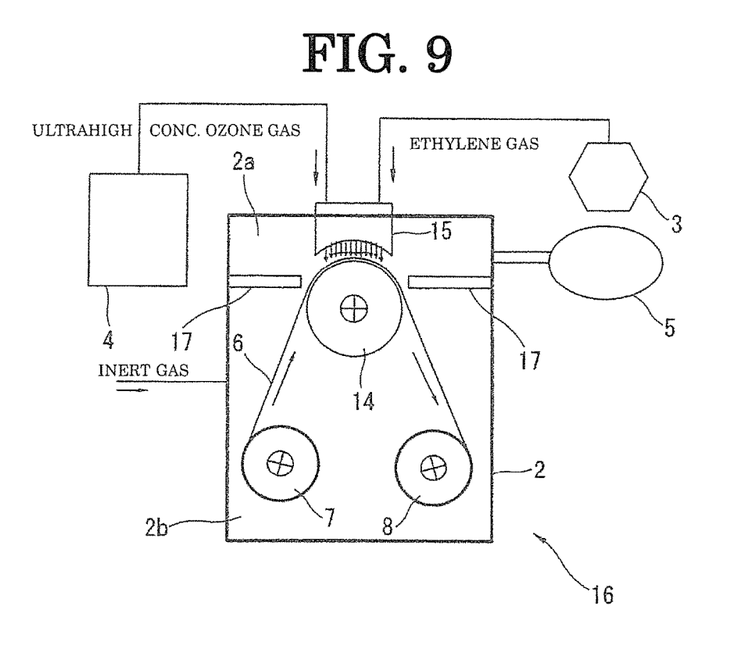
FIG. 9 is a schematic view of a modification apparatus according to the fourth embodiment of the present invention.

With reference to FIG. 9, a modification apparatus 16 of the resin film 6 according to the fourth embodiment of the present invention is explained in detail. The modification apparatus 16 according to the fourth embodiment is different from the modification apparatus 13 according to the third embodiment in that there is provided a partition plate 17 partitioning into a space where the shower head 15 is provided and a space where the supply roll 7 and the take-up roll 8 are provided. Therefore, structures similar to those of the modification apparatus 13 according to the third embodiment are designated by the same symbols, and different structures are explained in detail.

As shown in FIG. 9, the modification apparatus 16 according to the fourth embodiment of the present invention has a chamber 2, an unsaturated hydrocarbon supply device 3, an ozone generating device 4, and a vacuum pump 5.

In the chamber 2, there are provided the supply roll 7 and the take-up roll 8. There is provided the conveying roll 14 between the supply roll 7 and the take-up roll 8. The resin film 6 supplied from the supply roll 7 moves on the conveying roll 14 and is wound onto the take-up roll 8. The shower head 15 is provided to be opposed to this conveying roll 14. Furthermore, the partition plate 17 is provided in the chamber 2.

The partition plate 17 is provided, for example, in the vicinity of the conveying roll 14 and partitions the chamber 2 into a modification treatment space 2a for conducting modification of the resin film 6 and a storing space 2b for storing the resin film 6 before the treatment (and after the treatment). The modification treatment space 2a is provided with the shower head 15, and the modification treatment space 2a is provided with the vacuum pump 5 through a pipe. On the other hand, the storing space 2b is provided with the supply roll 7 and the take-up roll 8. Furthermore, to the storing space 2b, an inert gas (for example, nitrogen gas, etc.) cylinder not shown in the drawings is connected, thereby introducing an inert gas into the storing space 2b.

When conducting the modification treatment of the resin film 6 by the modification apparatus 16 mentioned above, the supply roll 7 onto which the resin film 6 has been wound is set in the chamber 2, and the chamber is evacuated, for example, to several pascals or less. While the resin film 6 supplied from the supply roll 7 is wound onto the take-up roll 8, the high-concentration ozone gas and the unsaturated hydrocarbon gas are supplied from the shower head 15 to the resin film 6, and the gas in the chamber 2 (modification treatment space 2a) is discharged to the outside by the vacuum pump 5 such that pressure in the chamber 2 becomes several thousand pascals or less (e.g., 3,000 pascals or less).

By the modification apparatus 16 according to the fourth embodiment of the present invention, similar to the modification apparatus 13 according to the third embodiment, it is possible to improve the surface of the resin film 6 in hydrophilicity and to conduct a modification treatment of the resin film 6 that is small in wettability effect disappearance after the modification treatment.

Furthermore, in the modification apparatus 16 according to the fourth embodiment, it is possible by providing the partition plate 17 to decrease the reactive gas (high-concentration ozone gas, unsaturated hydrocarbon gas and the reaction products) flowing into the storing space 2b. Furthermore, it is possible to further reduce the reactive gas flowing into the storing space 2b by supplying an inert gas into the storing space 2b to decrease the pressure difference between the modification treatment space 2a and the storing space 2b. By thus reducing the reactive gas flowing into the storing space 2b, an excessive exposure of the resin film 6 before the treatment (and after the treatment) to the reactive gas is suppressed, and it is possible to suppress deterioration of a sealing part of a roller rotation shaft of the supply roll 7 (and the take-up roll 8 and the conveying roll 14).

As mentioned above, the present invention's resin modification method and modification apparatus were explained in detail by showing specific embodiments, but the present invention's resin modification method and modification apparatus are not limited to the embodiments. Their designs can suitably be changed in an extent of not damaging characteristics of the invention, and the changed design modes are also included in the technical scope of the present invention.

It is possible to obtain a combined effect of respective embodiments by combining structures of the modification apparatuses according to respective embodiments. Specifically, it is possible in the modification apparatus 1 to partially obtain the effect achieved by the modification apparatus 16 by providing the partition plate 17 in the modification apparatus 1 according to the first embodiment. Furthermore, in the modification apparatus 13 of the third embodiment, it is also possible to make a mode where the both surfaces of the resin film 6 are treated at the same time by providing a plurality of the conveying rolls 14.

Furthermore, the discharge holes 10a, 10b of the shower head 10 are not limited to the modes of FIGS. 2, 3. For example, it is optional to mix together the high-concentration ozone gas and the unsaturated hydrocarbon gas immediately before the supply to the object such as resin and to supply the mixed gas from the shower head 10 to the resin 6.

The invention claimed is:

1. A resin modification method by providing an ozone gas having an ozone concentration of 50 volume % or more and an unsaturated hydrocarbon gas to a resin to make a surface of the resin hydrophilic by a reaction gas of the ozone gas and the unsaturated hydrocarbon gas, the method comprising:

winding a resin, which has previously been wound onto a winding shaft, onto another winding shaft, and providing the ozone gas and the unsaturated hydrocarbon gas to the resin moving between these winding shafts, in an alternate manner in a direction of the moving of the resin.

2. The resin modification method as claimed in claim 1, wherein the ozone gas and the unsaturated hydrocarbon gas are provided to the resin for one minute or less.

3. The resin modification method as claimed in claim 1, wherein a total pressure of a mixed gas of the ozone gas and the unsaturated hydrocarbon gas is from 50 Pa to 500 Pa.

\* \* \* \* \*